United States Patent
Shibagaki et al.

(10) Patent No.: US 6,621,034 B2
(45) Date of Patent: Sep. 16, 2003

(54) METHOD OF MANUFACTURING DIE

(75) Inventors: Yukinari Shibagaki, Nagoya (JP);
Yoshimasa Kondo, Nagoya (JP);
Takeyuki Ishii, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/732,826

(22) Filed: Dec. 8, 2000

(65) Prior Publication Data

US 2001/0004068 A1 Jun. 21, 2001

(30) Foreign Application Priority Data

Dec. 10, 1999 (JP) .......................................... 11-350963
Oct. 15, 2000 (JP) ........................................ 2000-305887

(51) Int. Cl.$^7$ .......................... B23K 9/00; B23H 1/00; B29C 47/12
(52) U.S. Cl. ................ 219/69.17; 219/69.1; 219/69.12; 219/68; 29/482; 264/177.11; 264/177.12
(58) Field of Search .............................. 219/69.1, 69.12, 219/69.17, 68; 29/482; 425/461; 264/177.12, 177.11, 177.1

(56) References Cited

U.S. PATENT DOCUMENTS

| | | | | |
|---|---|---|---|---|
| 3,038,201 A | | 6/1962 | Harkenrider | |
| 3,857,665 A | * | 12/1974 | Kennedy | 425/378.1 |
| 4,125,936 A | * | 11/1978 | Rozmus | 29/879 |
| 4,298,564 A | * | 11/1981 | Higuchi et al. | |
| 4,373,895 A | * | 2/1983 | Yamamoto et al. | |
| 4,527,035 A | * | 7/1985 | Majestic | 219/69.12 |
| 4,544,820 A | * | 10/1985 | Johnson | 219/69.15 |
| 4,722,819 A | * | 2/1988 | Lundsager | 264/177.11 |
| 4,915,612 A | * | 4/1990 | Gangeme et al. | 264/177.1 |
| 5,171,503 A | * | 12/1992 | Peters et al. | 264/177.11 |
| 5,286,323 A | * | 2/1994 | Bagley | 264/177.12 |
| 5,308,556 A | * | 5/1994 | Bagley | 264/13 |
| 5,308,568 A | * | 5/1994 | Lipp | 264/177.12 |
| 5,487,863 A | * | 1/1996 | Cunningham et al. | 264/177.11 |
| 5,630,951 A | * | 5/1997 | Peters | 219/69.12 |
| 5,731,562 A | * | 3/1998 | Beckmeyer et al. | 219/69.12 |
| 5,761,787 A | * | 6/1998 | Kragle et al. | 228/161 |
| 6,290,837 B1 | * | 9/2001 | Iwata et al. | 205/665 |
| 6,299,813 B1 | * | 10/2001 | Brew et al. | 264/177.12 |
| 6,302,679 B1 | * | 10/2001 | Seely | 425/380 |
| 6,335,548 B1 | * | 1/2002 | Roberts et al. | 250/239 |

FOREIGN PATENT DOCUMENTS

| | | | |
|---|---|---|---|
| EP | 0 402 593 | | 12/1990 |
| JP | 53-137210 | | 11/1978 |
| JP | 56-40510 | | 4/1981 |
| JP | 56-119335 | | 9/1981 |
| JP | 02-052703 A | * | 2/1990 |
| JP | 04-197534 A | * | 7/1992 |
| JP | 08-51176 A | * | 2/1996 |
| WO | 99/20445 | | 4/1999 |
| WO | WO 99/20445 | * | 4/1999 |

* cited by examiner

Primary Examiner—M. Alexandra Elve
Assistant Examiner—L. Edmondson
(74) Attorney, Agent, or Firm—Burr & Brown

(57) ABSTRACT

The method includes the steps of preparing a die main body; performing batch supply hole machining with respect to one principal plane of the die main body to form batch supply holes; using a cutting apparatus to perform slit machining with respect to the other principal plane of the die main body to form slits; without removing the cutting apparatus from the die main body, continuously performing lateral hole machining to form the batch bold portions, which are arranged at least at intersecting portions in the die main body between the batch supply holes and the slits and are arranged corresponding to the slits; and there after removing the cutting apparatus from the die main body to thereby form an integral die. Alternatively, the above slit machining and continuously performing lacteral hole machining steps can be performed first and followed by performing the batch supply hole machining step.

22 Claims, 8 Drawing Sheets

FIG. 1 - Prior Art
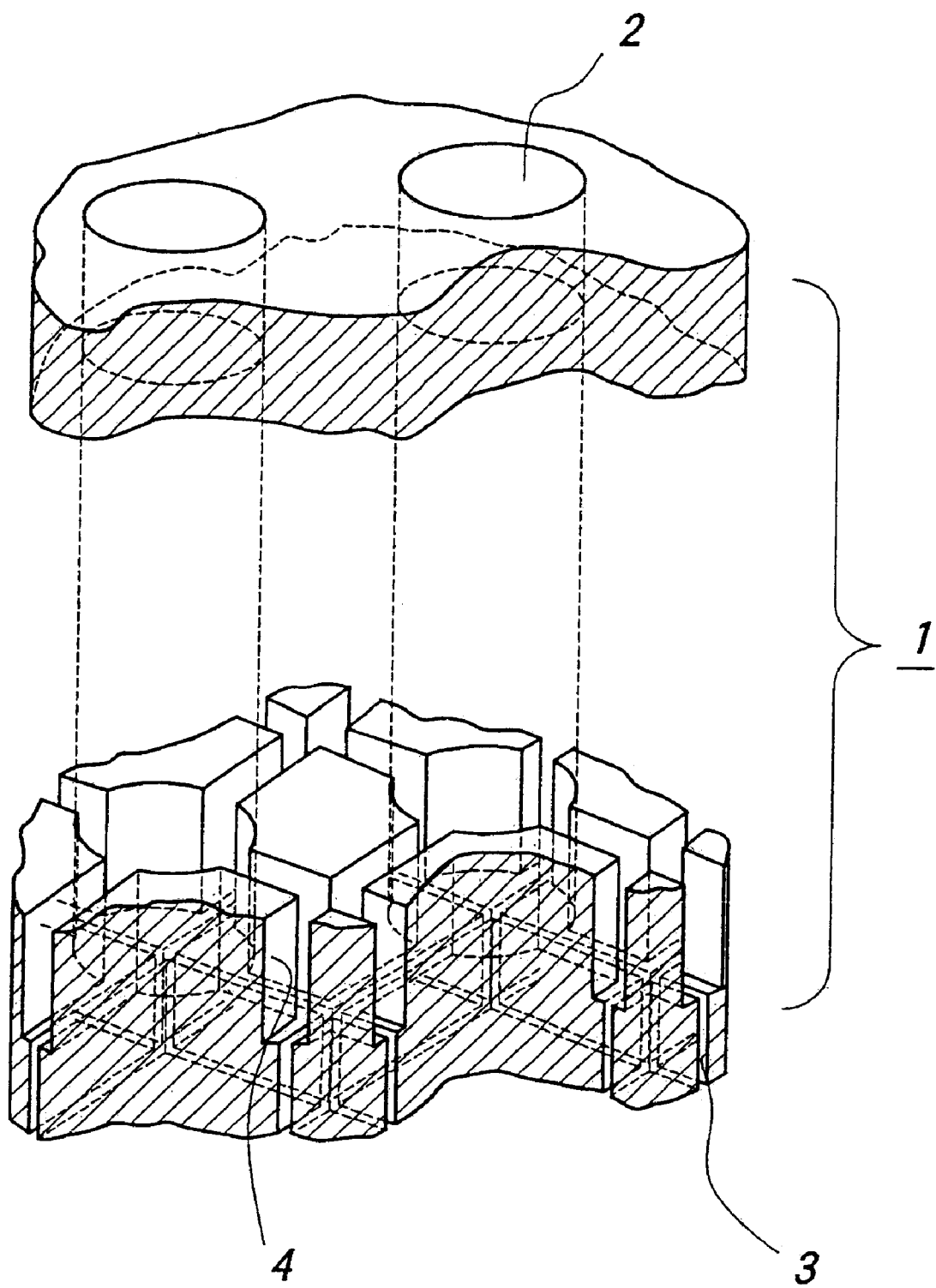

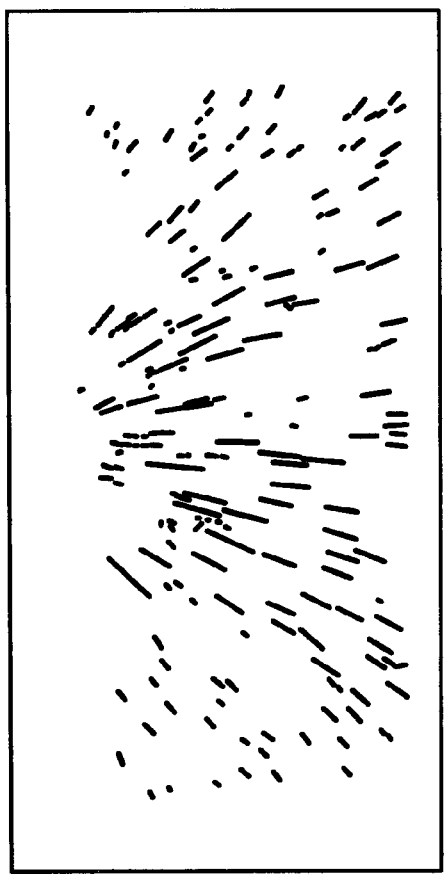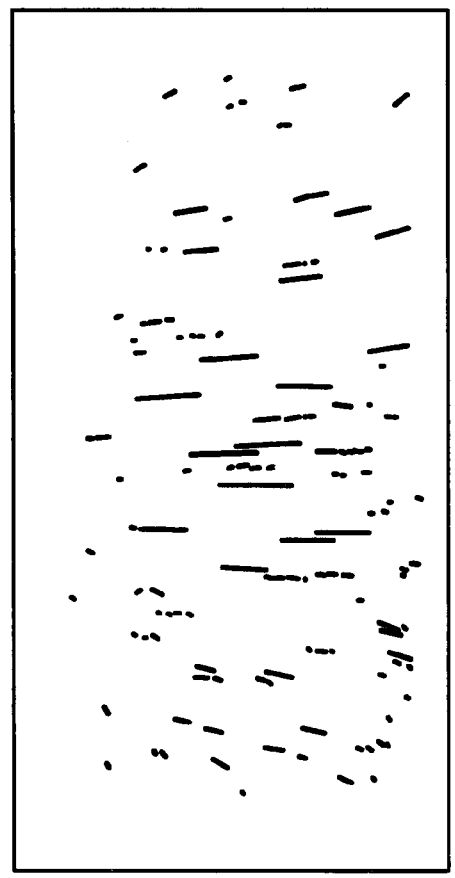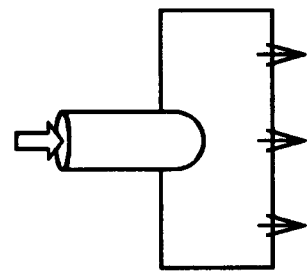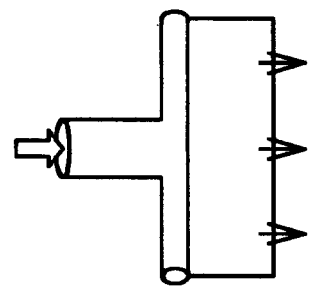
FIG. 5a (General die)
FIG. 5b (Die having lateral hole)

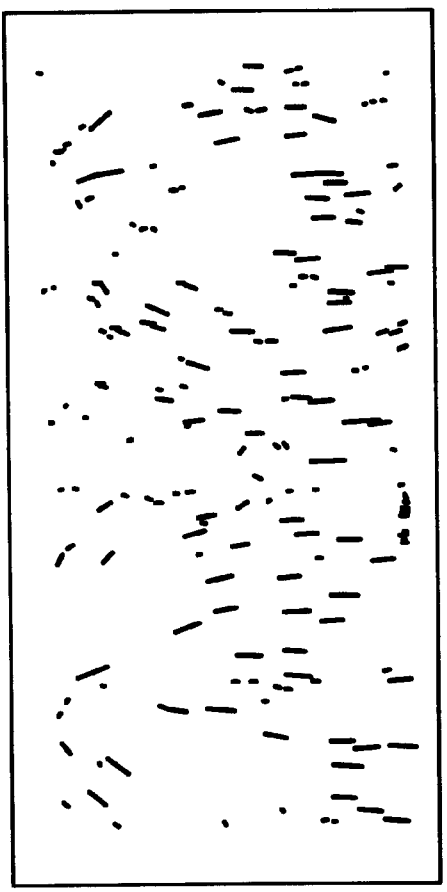 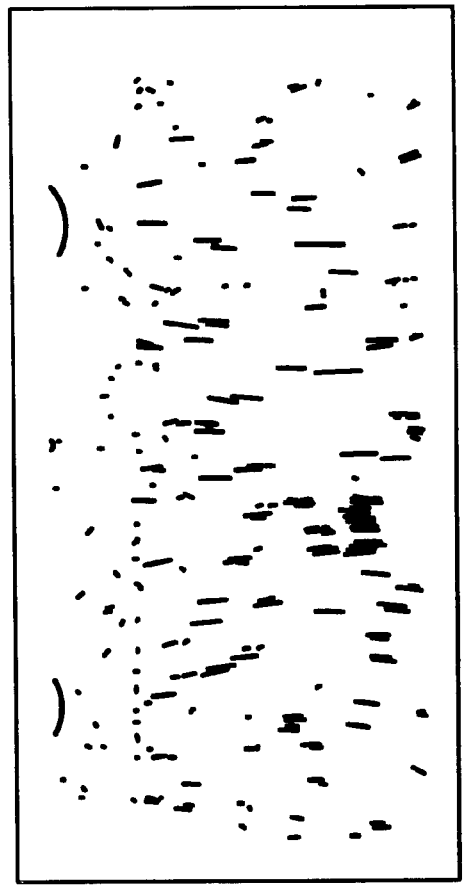
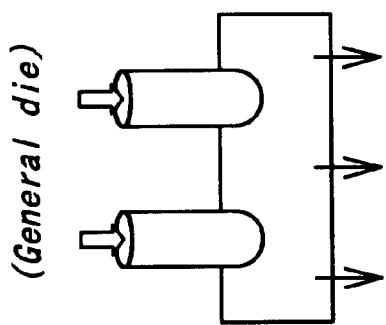
FIG. 6a
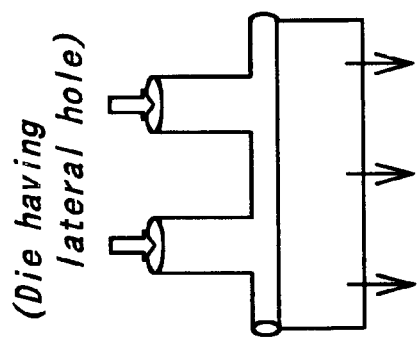
FIG. 6b (Lateral hole diameter is not varied)
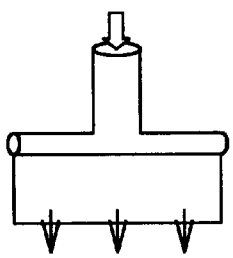
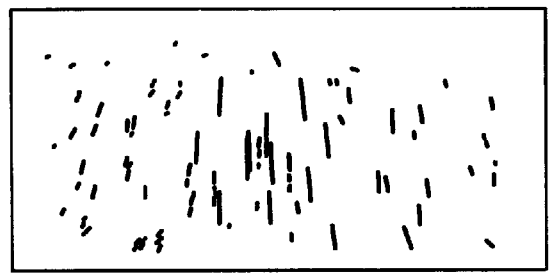
FIG. 7a
(Lateral hole diameter is varied)
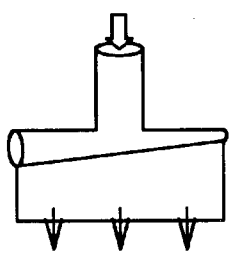
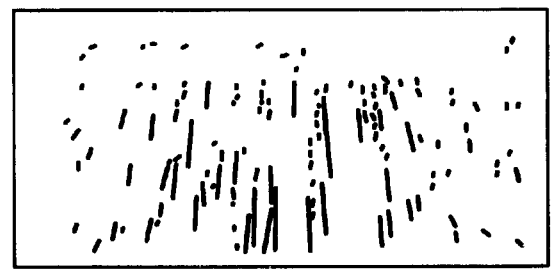
FIG. 7b
(Lateral hole diameter is varied)
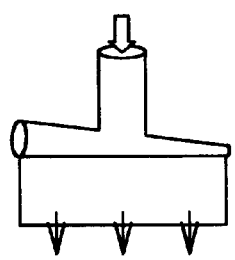
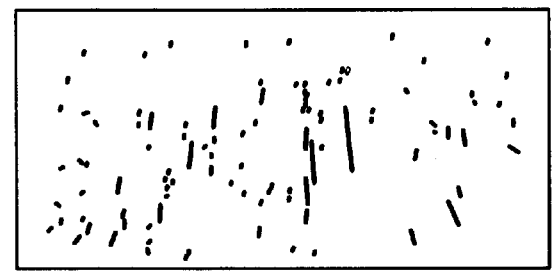
FIG. 7c

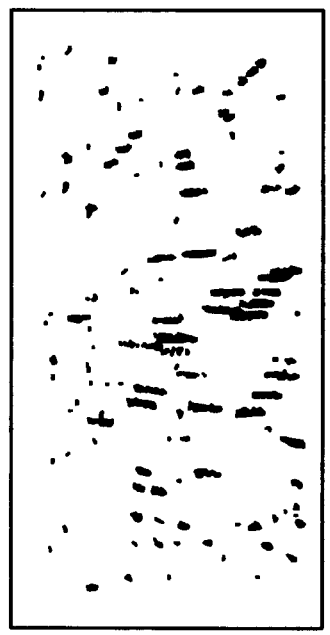
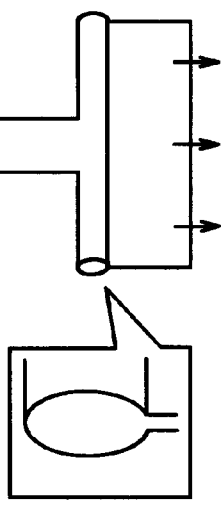
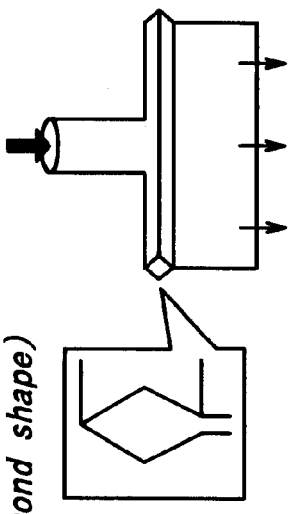
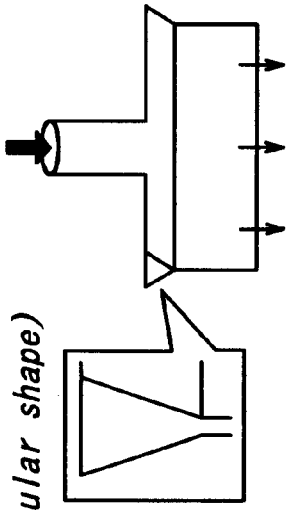
FIG. 8a (Circular shape)
FIG. 8b (Diamond shape)
FIG. 8c (Triangular shape)

METHOD OF MANUFACTURING DIE

BACKGROUND OF THE INVENTION

1. Field of the Invention

The present invention relates to a method of manufacturing a die having batch supply holes arranged at a batch supply side thereof, slits arranged at a batch discharge side of the die for forming the batch, and batch hold portions made of lateral holes, which are arranged at least at intersecting portions between the batch supply holes and the slits and are arranged corresponding to the slits, and particularly relates to a method of manufacturing a die for extruding honeycomb structural bodies having thin walls.

2. Description of the Related Art

As a die for extruding honeycomb structural bodies, there is a die comprising batch supply holes arranged at a batch supply side thereof, slits arranged at a batch discharge side of the die for forming the batch, and batch hold portions made of lateral holes, which are arranged at least at intersecting portions between the batch supply holes and the slits and are arranged corresponding to the slits. FIG. 1 is a schematic view showing one embodiment of a known die for forming honeycomb structural bodies disclosed in Japanese Patent Laid-Open Publication No. 53-137210 (JP-A-53-137210), and which is also an object of the present invention to be manufactured. In the embodiment shown in FIG. 1, a die 1 includes batch supply holes 2 arranged at a batch supply side of the die 1, slits 3 arranged at a batch discharge side of the die 1 for forming the batch. Batch hold portions of the die include lateral holes 4, which are arranged at least at intersecting portions between the batch supply holes 2 and the slits 3. The lateral holes 4 are arranged to correspond to the slits 3.

In the die 1 having the construction mentioned above, a dimension of the lateral hole 4 forming the batch hold portion is larger than that of the slit 3. Therefore, in order to manufacture the die 1 having the construction mentioned above, there is one technique, as disclosed in Japanese Patent Laid-Open Publication No. 56-40510 (JP-A-56-40510), such that, a metal plate is connected by brazing to a metal block to which the batch supply holes 2 and the lateral holes 4 are preliminarily worked, and then a slit machining is performed with respect to the metal plate. Moreover, there is another technique, as disclosed in Japanese Patent Laid-Open Publication No. 56-119335 (JP-A-56-119335), such that, a metal plate is connected by brazing to a metal block to which the batch supply holes 2 and the lateral holes 4 are preliminary worked, and then a slit machining is performed with respect to the metal plate. A depression portion is formed in the metal plate and the depression portion of the metal plate is fitted by brazing to the metal block.

In the method of manufacturing the die 1 mentioned above, since the metal plate to which the slits are formed is connected by brazing to the metal block, a brazing portion becomes a weak point, and thus it is not possible to make stronger the slits to which a large load is applied during a batch extruding operation. Moreover, in an extreme case, the brazing portion is peeled off and the die does not function for extruding. Further, in the case that the depression portion of the metal plate is fitted to the metal block, it is difficult to fit all of the depression portions to a plurality of projections of the metal block at one operation, and thus a high precision die cannot be manufactured.

SUMMARY OF THE INVENTION

It is an object of the present invention to eliminate the drawbacks mentioned above and to provide a method of manufacturing a die, in which the manufactured die has a sufficient strength and a high precision.

According to the invention, a method of manufacturing a die having batch supply holes arranged at a batch supply side thereof, slits arranged at a batch discharge side thereof for forming the batch, and batch hold portions including lateral holes, which are arranged at least at intersecting portions between the batch supply holes and the slits and are arranged corresponding to the slits, include the following steps of:

(1) preparing a die main body;(2) performing a batch supply hole machining with respect to one principle plane of the die main body so as to form the batch supply holes; (3) performing a slit machining with respect to the other principle plane of the die main body so as to form the slits; and (4) performing a lateral hole machining so as to form the batch hold portions, which are arranged at least at intersecting portions in the die main body between the batch supply holes and the slits and are arranged corresponding to the slits to thereby form an integral die. The method may also include the following steps:

(1) preparing a main body; (2) performing a slit machining with respect to one principle plane of the die main body; (3) performing a lateral hole machining so as to form the batch hold portions arranged corresponding to the slits in the die main body; and (4) performing a batch supply hole machining with respect to the other principle plane of the die main body so as to form the batch supply holes to thereby form an integral die.

In the present invention, an order of the machining operations is different between the above described methods. However, in both cases, the batch supply hole machining, the slit machining and the lateral hole machining are performed with respect to the die main body in a predetermined order, and the die is manufactured integrally. Therefore, no brazing portion is existent in the die as compared with the known die, and thus it is possible to obtain the die having a sufficient strength and a high precision.

As a preferred embodiment of the present invention, the lateral hole machining is performed by at least one of wire electric-discharge machining, electrochemical machining, wire lap machining, diesinking electric-discharge machining, water-jet machining, drill machining and laser machining. In addition, the slit machining and the lateral hole machining are performed continuously by wire electric-discharge machining. Moreover, the manufactured die is used for extruding a thin wall honeycomb structural body having a rib thickness of not larger than 150 μm. Further, a width of the slit is not larger than 250 μm. Furthermore, the manufactured die is used for extruding a honeycomb structural body having a cell open rate of not smaller than 75%. Moreover, the manufactured die is used for extruding a honeycomb structural body having a cell density of not larger than 1800 cell/inch$^2$. In all the preferred embodiments mentioned above, a die having improved properties can be manufactured easily.

BRIEF DESCRIPTION OF THE DRAWINGS

The present invention will be further explained in detail hereinafter with reference to the accompanying drawings, in which:

FIG. 1 is a schematic view showing one embodiment of a known die having batch hole portions, which is an object of the present invention to be manufactured;

FIGS. 5a and 5b are schematic views respectively illustrating an investigation result of the batch flow using a die construction having one batch supply hole;

FIGS. 6a and 6b are schematic views respectively depicting an investigation result of the batch flow using a die construction having two batch supply holes;

FIGS. 7a to 7c are schematic views respectively showing an investigation result of the batch flow under the condition such that the lateral holes are varied; and FIGS. 8a to 8c are schematic views respectively illustrating an investigation result of the batch flow under the condition such that shapes of the lateral holes are varied.

DETAILED DESCRIPTION OF THE INVENTION

A die 1, which is an object of the present invention to be manufactured, is shown in FIG. 1. The die 1 includes the batch supply holes 2 arranged at the batch supply side of the die 1 and slits 3 arranged at the batch discharge side of the die 1 for forming the batch. Batch hold portions of the die include lateral holes 4, which are arranged at least at the intersecting portions between the batch supply holes 2 and the slits 3 and are arranged corresponding to the slits 3.

As stated above, it is defined that the lateral holes 4 are arranged at least at the intersecting portions between the batch supply holes 2 and the slits 3, and are arranged corresponding to the slits 3. This definition means that the construction of the die 1 includes the following:

(1) an all hole type construction in which the lateral holes 4 are existent at all the intersecting portions between the batch supply holes 2 and the slits 3; (2) an alternate hole type construction in which the lateral holes 4 are existent at alternate intersecting portions between the batch supply holes 2 and the slits 3; and (3) a few hole type construction in which the lateral holes 4 are existent at a few intersecting portions between the batch supply holes 2 and the slits 3. Under such a condition, this definition makes clear that the lateral holes 4 are existent at all the positions where the slits 3 are arranged. Particularly, in the die having the batch hold portions according to the invention, if the number of the batch supply holes 2 is decreased, there is an effect such that a uniform batch extrusion can be achieved. The feature of the invention is how to manufacture such a die 1.

Figure 2A:
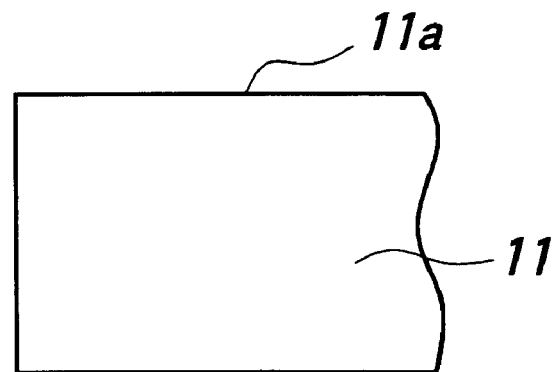
FIGS. 2a to 2d are schematic views respectively illustrating one embodiment of a method of manufacturing a die according to the invention in a processing order.

FIGS. 2a–2d are schematic views respectively showing one embodiment of the method of manufacturing a die according to the invention in a processing order. Hereinafter, the method of manufacturing the die according to the invention will be explained with reference to the FIGS. 2a–2d. At first, as shown in FIG. 2a, a die main body 11 having two principle planes 11a and 11b is prepared. Materials of the die main body 11 are not limited particularly, and all the known materials used generally for a die can be used in the present invention. Generally, such dies are made of stainless steel. A plate having a dimension of, for example, 200 mm×200 mm×20 mm is cut out by using whetstone from stainless steel so as to form the die main body 11.

Figure 2B:
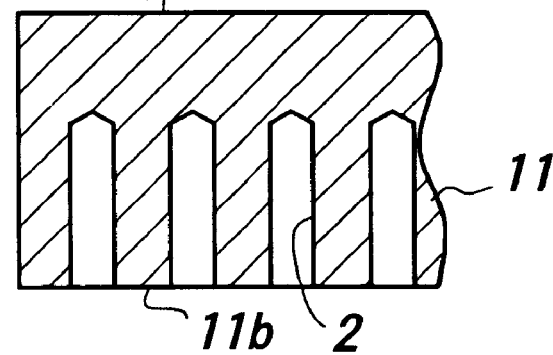

Then, as shown in FIG. 2b, batch supply holes 2 are formed in one principle plane 11b of the thus prepared die main body 11. Machining methods of the batch supply holes 2 are not limited particularly, and all the machining methods used generally for such batch supply hole machining can be used. Generally, batch supply holes are formed using a wire electric-discharge machining or electrochemical machining. A necessary number of the batch supply holes 2 having a dimension of, for example, a diameter of 1.5 mm and a depth of 150 mm are formed by drill machining to the principle plane 11b of the die main body 11.

Figure 2C:
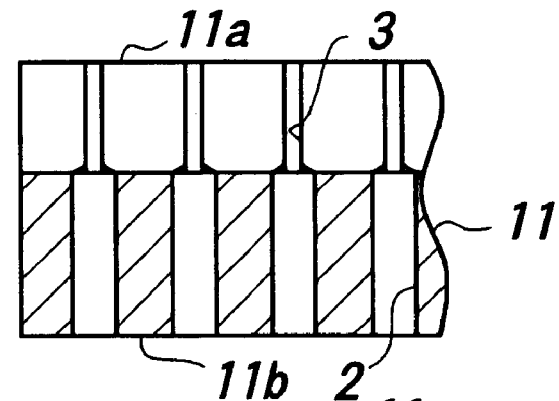

Then, as shown in FIG. 2c, slits 3 are formed extending to the other principle plane 11a of the die main body 11 after the batch supply hole machining. Machining methods of the slits 3 are not limited particularly, and all the machining methods used generally for slit machining can be used. Generally, methods used for forming slits are wire electric-discharge machining or whetstone machining. Conditions of the wire electric-discharge machining are the same as those of wire electric-discharge machining for a lateral hole machining mentioned below. In the case of the whetstone machining, use is made of the whetstone having a thickness of 0.2 mm. A necessary number of the slits 3 having a dimension of, for example, a width of 0.23 mm and a depth of 60 mm are formed extending to the principle plane 11a of the die main body 11.

Figure 2D:
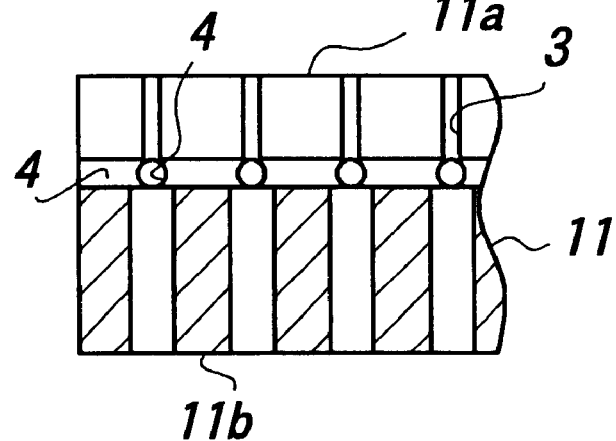

Then, as shown in FIG. 2d, lateral holes 4 constituting batch hold portions are formed at least at intersecting portions between the batch supply holes 2 and the slits 3, and correspond to the slits 3 in the die 1. Machining methods of the lateral hole 4 are not limited particularly, but, as a preferred embodiment, use is made of at least one of wire electric-discharge machining, electrochemical machining, wire lap machining, diesinking electric-discharge machining, water-jet machining, drill machining and laser machining. Among them, it is further preferred that wire electric-discharge machining, electrochemical machining or wire lap machining is used.

One example of the wire electric-discharge machining is as follows: diameter of used wire: 0.08 mm; transfer speed: 1.2 mm/sec.; wire tension: 400 gf; discharge condition voltage of 200 V, peak current of 4 A, discharge time of 2 $\mu$s, idle time of 400 $\mu$s; resistivity of deionized water: 105 $\Omega$mm (insertion method); and wire property: high strength wire. When the machining of the slits 3 and the lateral holes 4 are performed by the wire electric-discharge machining in this embodiment, the machining of the slits 3 and the lateral holes 4 can be performed at once, i.e., the machining of the lateral holes 4 can be performed continuously after the machining of the slits 3. In this case, it is possible to perform the machining process easily. Finally, the die main body 11 is machined to a predetermined shape such as a circular shape so as to obtain the die 1.

Figure 3:
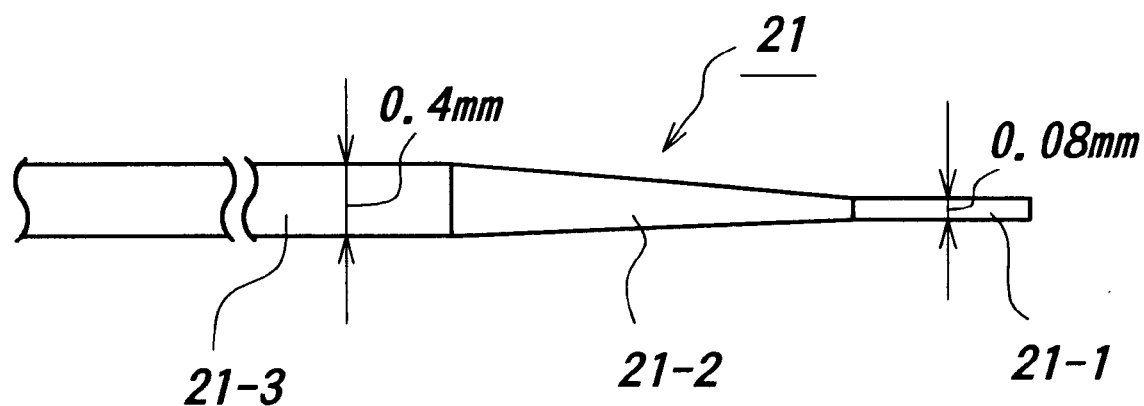
FIG. 3 is a schematic view depicting one embodiment of a piano wire used when a lateral hole is machined by wire lap machining as a preferred embodiment.

Moreover, one example of the electrochemical machining is as follows: tube: Ti tube having diameter of 0.4 mm; electrolytic solution: 15% nitric acid solution; amount of electrolytic solution: 0.7 cc/sec.; voltage: 5 V; and current: 0.5 A. Further, in the wire lap machining, as shown in FIG. 3, a piano wire 21 comprising a portion 21-1 having a constant diameter of 0.08 mm (for example 1 m length), a portion 21-2 in which a diameter thereof is gradually increased from 0.08 mm to 0.4 mm, and a portion 21-3 having a constant diameter of 0.4 mm (necessary length) is prepared. Then, the thus prepared piano wire 21 is set in the slit 3. Under such a condition, the piano wire 21 is moved back and forth in the slit 3 while alumina having a particle size of about 20 $\mu$m and solvent are supplied in the slit 3, so that the lateral hole 4 can be formed. In the case that the lateral holes 4 are machined by the wire lap machining as mentioned above, the piano wire 21 shown in FIG. 3 can be formed by etching and a diameter of the piano wire 21 can be made smaller. Therefore, the lateral holes 4 having smaller diameters can be formed. Moreover, even if the slits 3 are bent slightly, the lateral holes 4 can be preferably formed. In this manner, by utilizing at least one of the machining methods mentioned above, the necessary number of the lateral holes 4 having a dimension of, for example, a diameter of 0.5 mm and a length of 200 mm can be formed at the intersecting portions between the batch supply holes 2 and the slits 3 in the die main body 11.

In the manufacturing method according to the invention, the lateral holes 4 are formed by directly machining the die main body 11. Preferably, in view of a situation that the lateral holes 4 are existent corresponding to the slits 3, the lateral holes 4 are formed by machining the die main body 11 by utilizing the preliminarily formed slits 3. Therefore, the batch supply holes 2, the slits 3 and the lateral holes 4 can be formed integrally in the die main body 11. In order to machine the die main body 11 by utilizing the slits 3, it is preferred to use the wire electric-discharge machining mentioned above. Moreover, since the electrochemical machining is easy to work and a reasonable lateral machining can be performed, it is also preferred to use the electrochemical machining. Further, the die manufactured according to the manufacturing method of the invention can be freely used for forming a wide variety of materials, but it is particularly preferred to use the die for forming honeycomb structural bodies such as the thin honeycomb structural body in which a rib thickness is not larger than 150 μm, the honeycomb structural body in which a cell open rate is not smaller than 75%, and the honeycomb structural body in which a cell density is not larger than 1800 cell/inch$^2$. Such honeycomb structural bodies mentioned above are thought to be difficult to form by known dies, since the rib thickness is thin. Particularly, in the case that the cell density is larger than 1800 cell/inch$^2$, if the lateral hole is machined according to the known manufacturing method, the slits of the die are deformed, since the lateral hole-slit portions are weak due to the lateral holes during an actual batch extrusion.

In the embodiment mentioned above, the processing order is batch supply hole machining→slit machining→lateral hole machining, but it is a matter of course that the present invention can be applied to the processing orders of, slit machining→batch supply hole machining→lateral hole machining, and, slit machining→lateral hole machining→batch supply hole machining. Also in the embodiments mentioned above, various kinds of machining methods mentioned above can be utilized.

Figures 4A, 4B:
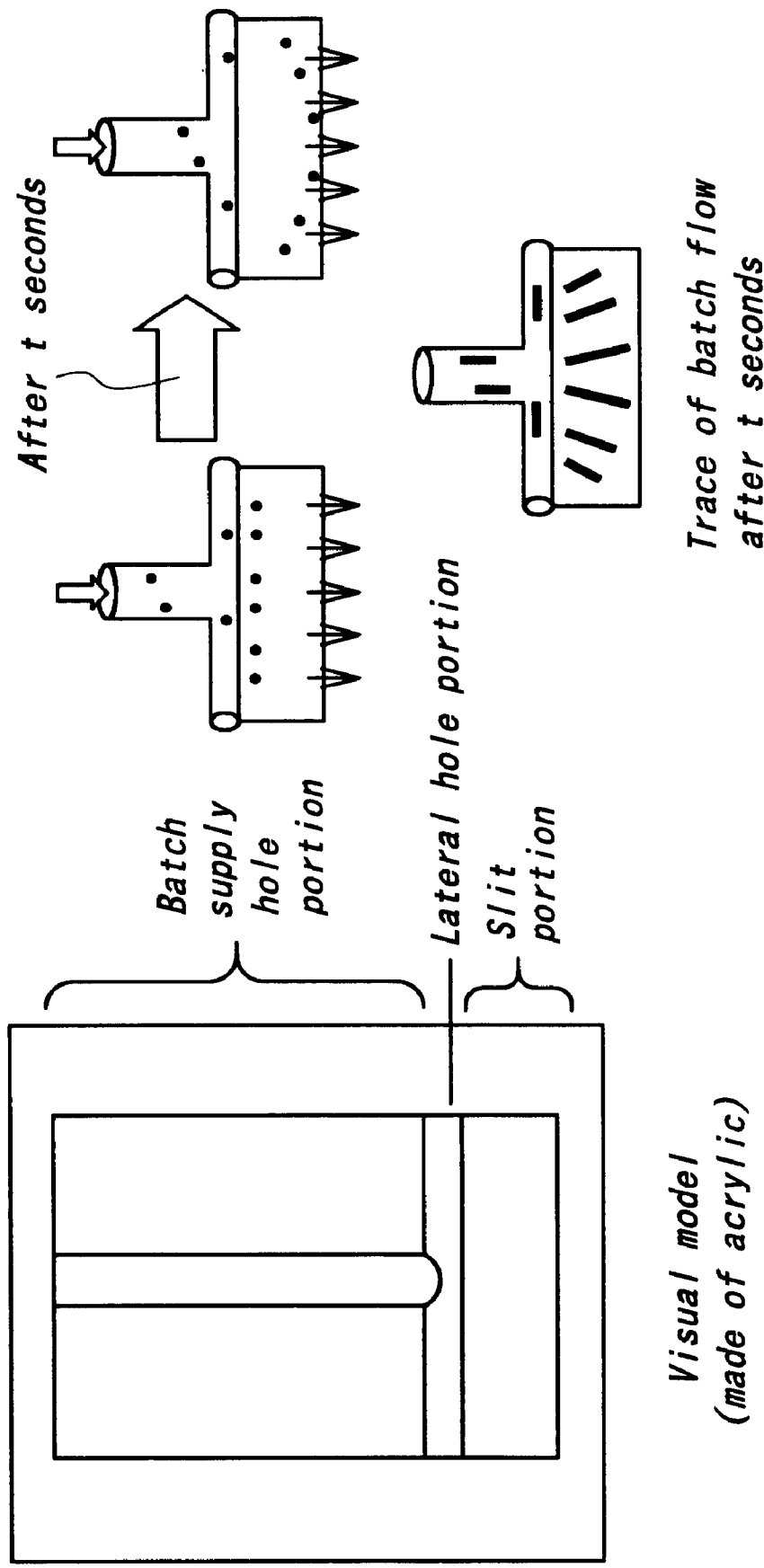
FIG. 4a is a schematic view showing one embodiment of a visual model and FIG. 4b is a schematic view for explaining an investigation method of a batch flow.

Then, batch flow investigations utilizing a visual model were performed to compare the die having the batch hole portions obtained according to the manufacturing method of the invention and the die having no lateral holes. The aim of the batch flow investigation is to investigate an effectiveness of the die having the lateral holes and to investigate effects of lateral hole shape, lateral hole variation, and so on, by simulating or visualizing the batch flow during the honeycomb extrusion process. At first, as shown in FIG. 4a, as one example, a batch supply hole portion, a lateral hole portion and a slit portion were constructed from acrylic to prepare the visual model. Then, as shown in FIG. 4b a batch prepared by mixing an oil clay and a tracer (chaff) was extruded using the visual model. During the batch extrusion, a movement of the tracer was followed after t seconds so as to investigate a batch flow direction and a flow speed at respective positions.

FIGS. 5a and 5b show respectively an investigation result of the batch flow in the die model having one batch supply hole. FIGS. 6a and 6b illustrate respectively an investigation result of the batch flow in the die model having two batch supply holes. From the investigation results shown in FIGS. 5a, 5b and FIGS. 6a, 6b, it is understood that a uniform batch extrusion can be achieved in the die having lateral holes as compared with the general die having no lateral holes as evidenced by the tracers being aligned parallel in a lengthwise direction. Moreover, it is understood that a uniform batch extrusion can be achieved regardless of the number of the batch supply holes.

Then, the same investigation was performed with respect to the die model in which the lateral hole diameter is not varied and the die model in which the lateral hole diameter is varied. FIGS. 7a–7c are schematic views showing respectively the investigation result of the die mentioned above. That is to say, FIG. 7a shows the investigation result of the die model in which the lateral hole diameter is not varied, and FIGS. 7b and 7c illustrate respectively the result of the die model in which the lateral hole diameter is varied. From the investigation results shown in FIGS. 7a–7c, it is understood that the variation of the lateral hole diameter does not greatly affect the arrangement of the tracers.

Then, FIGS. 8a–8c show respectively the investigation result of the batch flow in the die model in which a shape of a cross section of the lateral hole is varied. Here, FIG. 8a shows the investigation result of the die model in which the cross section of the lateral hole is a circular shape. FIG. 8b illustrates the investigation result of the die model in which the cross section of the lateral hole is a diamond shape. FIG. 8c depicts the investigation result of the die model in which the cross section of the lateral hole is a triangular shape. From the results shown in FIGS. 8a–8c, it is understood that the shape of the cross section of the lateral hole does not greatly affect the arrangement of the tracers.

As clearly understood from the explanations mentioned above, according to the invention, the batch supply hole machining, the slit machining and the lateral hole machining are performed with respect to the die main body in a predetermined order, and the die is manufactured integrally. Therefore, no brazing portion is existent in the die as compared with the known die, and thus it is possible to obtain the die having a sufficient strength and a high precision.

What is claimed is:

1. A method of manufacturing a die having batch supply holes arranged at a batch supply side thereof, slits arranged at a batch discharge side thereof for forming the batch, and batch hold portions made of lateral holes, which are arranged at least at intersecting portions between the batch supply holes and the slits and are arranged corresponding to the slits, said method comprising the steps of:

(a) preparing a die main body;

(b) performing batch supply hole machining with respect to one principal plane of the die main body to form the batch supply holes;

(c) using a cutting apparatus to perform slit machining with respect to the other principal plane of the die main body to form the slits;

(d) without removing the cutting apparatus from the die main body, continuously performing lateral hole machining to form the batch hold portions, which are arranged at least at intersecting portions in the die main body between the batch supply holes and the slits and are arranged corresponding to the slits; and (e) thereafter removing the cutting apparatus from the die main body to thereby form an integral die.

2. A method of manufacturing a die having batch supply holes arranged at a batch supply side thereof, slits arranged at a batch discharge side thereof for forming the batch, and batch hold portions made of lateral holes, which are arranged at least at intersecting portions between the batch supply holes and the slits and are arranged corresponding to the slits, said method comprising the steps of:

(a) preparing a die main body;

(b) using a cutting apparatus to perform slit machining with respect to one principal plane of the die main body to form the slits;

(c) without removing the cutting apparatus from the die main body, continuously performing lateral hole machining to form the batch hold portions arranged corresponding to the slits in the die main body; and (d) thereafter removing the cutting apparatus from the die main body and performing batch supply hole machining with respect to the other principal plane of the die main body to form the batch supply holes to thereby form an integral die.

3. The method of manufacturing a die according to claim 1, wherein said lateral hole machining step is performed by at least one method selected from the group consisting of wire electric-discharge machining, wire lap machining, water-jet machining and laser machining.

4. The method of manufacturing a die according to claim 1, wherein the manufactured die is used for extruding a thin wall honeycomb structural body having a rib thickness of not larger than 150 $\mu$m.

5. The method of manufacturing a die according to claim 1, wherein a width of the slit is not larger than 250 $\mu$m.

6. The method of manufacturing a die according to claim 1, wherein the manufactured die is used for extruding a honeycomb structural body having a cell open rate of not smaller than 75%.

7. The method of manufacturing a die according to claim 1, wherein the manufactured die is used for extruding a honeycomb structural body having a cell density of not larger than 1800 cell/inch$^2$.

8. The method of manufacturing a die according to claim 2, wherein said lateral hole machining step is performed by at least one method selected from the group consisting of wire electric-discharge machining, wire lap machining, water-jet machining, and laser machining.

9. The method of manufacturing a die according to claim 2, wherein the manufactured die is used for extruding a thin wall honeycomb structural body having a rib thickness of not larger than 150 $\mu$m.

10. The method of manufacturing a die according to claim 2, wherein a width of the slit is not larger than 250 $\mu$m.

11. The method of manufacturing a die according to claim 2, wherein the manufactured die is used for extruding a honeycomb structural body having a cell open rate of not smaller than 75%.

12. The method of manufacturing a die according to claim 2, wherein the manufactured die is used for extruding a honeycomb structural body having a cell density of not larger than 1800 cell/inch$^2$.

13. A method of manufacturing a die having batch supply holes arranged at a batch supply side thereof, slits arranged at a batch discharge side thereof for forming the batch, and batch hold portions made of lateral holes, which are arranged at least at intersecting portions between the batch supply holes and the slits and are arranged corresponding to the slits, said method comprising the steps of:

(a) preparing a die main body;

(b) performing batch supply hole machining with respect to one principal plane of the die main body to form the batch supply holes;

(c) using a wire electric-discharge machining apparatus to perform slit machining with respect to the other principal plane of the die main body to form the slits;

(d) without removing the wire electric-discharge machining apparatus from the die main body, continuously performing lateral hole machining to form the batch hold portions, which are arranged at least at intersecting portions in the die main body between the batch supply holes and the slits and are arranged corresponding to the slits; and (e) thereafter removing the wire electric-discharge machining apparatus from the die main body to thereby form an integral die.

14. A method of manufacturing a die having batch supply holes arranged at a batch supply side thereof, slits arranged at a batch discharge side thereof for forming the batch, and batch hold portions made of lateral holes, which are arranged at least at intersecting portions between the batch supply holes and the slits and are arranged corresponding to the slits, said method comprising the steps of:

(a) preparing a die main body;

(b) using a wire electric-discharge machining apparatus to perform slit machining with respect to one principal plane of the die main body to form the slits;

(c) without removing the wire electric-discharge machining apparatus from the die main body, continuously performing lateral hole machining to form the batch hold portions arranged corresponding to the slits in the die main body; and (d) thereafter removing the wire electric-discharge machining apparatus from the die main body and performing batch supply hole machining with respect to the other principal plane of the die main body to form the batch supply holes to thereby form an integral die.

15. The method of manufacturing a die according to claim 13, wherein the manufactured die is used for extruding a thin wall honeycomb structural body having a rib thickness of not larger than 150 $\mu$m.

16. The method of manufacturing a die according to claim 13, wherein a width of the slit is not larger than 250 $\mu$m.

17. The method of manufacturing a die according to claim 13, wherein the manufactured die is used for extruding a honeycomb structural body having a cell open rate of not smaller than 75%.

18. The method of manufacturing a die according to claim 13, wherein the manufactured die is used for extruding a honeycomb structural body having a cell density of not larger than 1800 cell/inch$^2$.

19. The method of manufacturing a die according to claim 14, wherein the manufactured die is used for extruding a thin wall honeycomb structural body having a rib thickness of not larger than 150 $\mu$m.

20. The method of manufacturing a die according to claim 14, wherein a width of the slit is not larger than 250 $\mu$m.

21. The method of manufacturing a die according to claim 14, wherein the manufactured die is used for extruding a honeycomb structural body having a cell open rate of not smaller than 75%.

22. The method of manufacturing a die according to claim 14, wherein the manufactured die is used for extruding a honeycomb structural body having a cell density of not larger than 1800 cell/inch$^2$.

* * * * *

UNITED STATES PATENT AND TRADEMARK OFFICE
CERTIFICATE OF CORRECTION

PATENT NO.      : 6,621,034 B2
DATED           : September 16, 2003
INVENTOR(S)     : Yukinari Shibagaki, Yoshimasa Kondo and Takeyuki Ishii It is certified that error appears in the above-identified patent and that said Letters Patent is hereby corrected as shown below:

<u>Title page,</u>
Item [57], ABSTRACT,
Line 11, please change "there after" to -- thereafter --.

<u>Column 2,</u>
Lines 11, 14, 23 and 28, please change "principle" to -- principal --.

<u>Column 3,</u>
Lines 58 and 67, please change "principle" to -- principal --.

<u>Column 4,</u>
Lines 8, 11 and 23, please change "principle" to -- principal --.

Signed and Sealed this

Twenty-eighth Day of October, 2003

JAMES E. ROGAN
*Director of the United States Patent and Trademark Office*